United States Patent [19]

Pflederer

[11] Patent Number: 4,556,204
[45] Date of Patent: Dec. 3, 1985

[54] FIBER REINFORCED RESIN LEAF SPRING

[75] Inventor: Fred R. Pflederer, Milwaukee, Wis.

[73] Assignee: A. O. Smith Corp., Milwaukee, Wis.

[21] Appl. No.: 643,708

[22] Filed: Aug. 24, 1984

[51] Int. Cl.$^4$ ................................................ F16F 1/18
[52] U.S. Cl. ........................................ 267/148; 267/47
[58] Field of Search .................. 267/36 R, 40, 44, 47, 267/54 R, 55, 148, 149

[56] References Cited

U.S. PATENT DOCUMENTS

| | | | |
|---|---|---|---|
| 1,546,584 | 7/1925 | Hutt | 267/47 |
| 3,056,706 | 10/1962 | Knoppel | 154/43 |
| 3,142,598 | 7/1964 | Rosen | 156/162 |
| 3,367,033 | 4/1968 | Sherwood | 267/47 |
| 3,968,958 | 7/1976 | Huchette et al. | 267/47 |
| 4,114,962 | 9/1978 | Konig et al. | 308/238 |
| 4,414,049 | 11/1983 | Jones | 156/166 |

FOREIGN PATENT DOCUMENTS 474985 11/1937 United Kingdom .

Primary Examiner—Duane A. Reger
Attorney, Agent, or Firm—Andrus, Sceales, Starke & Sawall

[57] ABSTRACT

A fiber reinforced resin leaf spring including a curved central section and a pair of generally circular end sections connected to the respective ends of the central section. Each end section defines an opening to receive a connecting member. The spring is wound from an endless strand of substantially continuous fibers impregnated with a cured thermosetting resin. A plurality of longitudinally extending ribs are formed in the neck region of the spring, which joins the curved central section to the respective end sections. The ribs, which extend alternately upwardly and downwardly from a plane extending through the neutral axis of the spring, increase the stiffness of the spring in the neck region and prevent delamination of the fibrous windings during service.

6 Claims, 4 Drawing Figures

FIG. 1
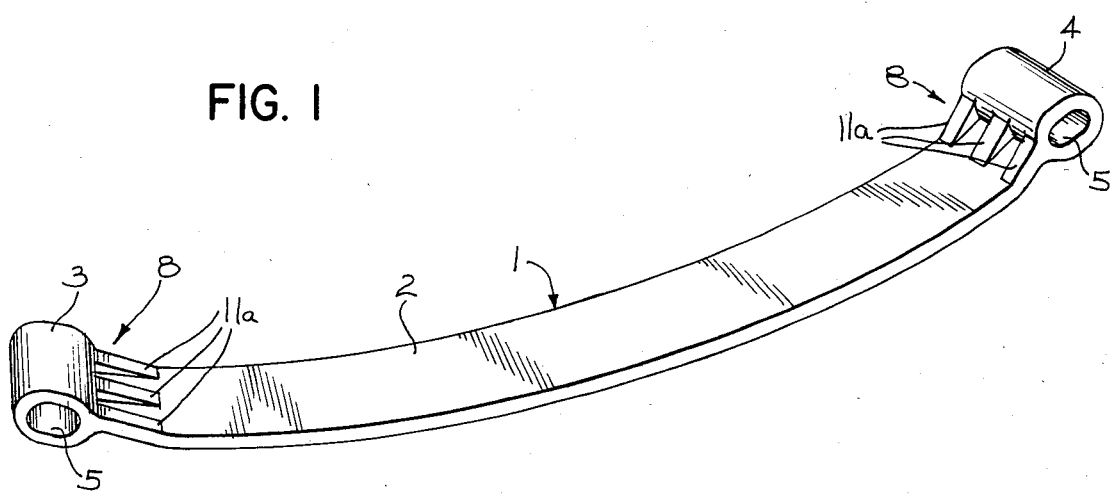
FIG. 2
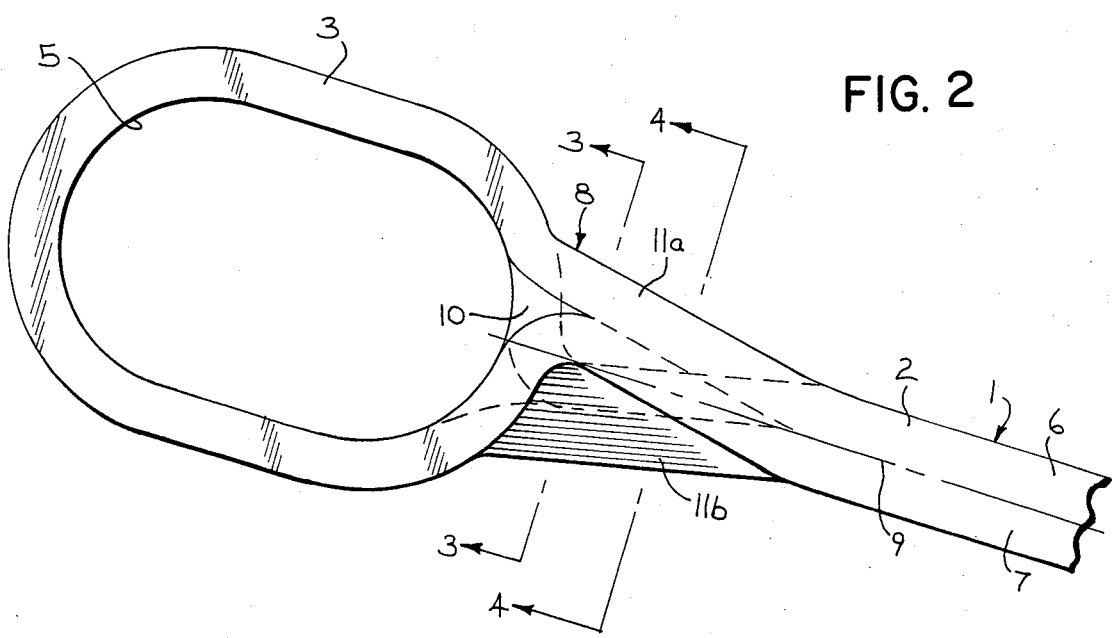
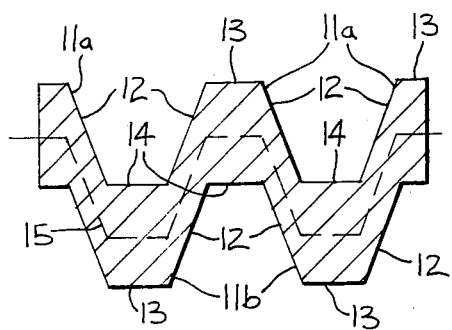
FIG. 3
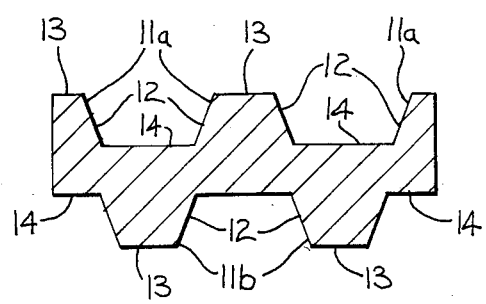
FIG. 4

FIBER REINFORCED RESIN LEAF SPRING

BACKGROUND OF THE INVENTION

In the past, leaf springs for vehicles have traditionally been fabricated from a series of superimposed steel leaves. Steel leaf springs are not only a relatively heavy construction but can be noisy, having a tendency to squeak, and are subject to corrosion. Recently, in order to decrease the overall weight of the vehicle, attempts have been made to utilize fiber reinforced resin materials as a substitute for steel leaf springs. In certain leaf springs of this type, the curved central section of the spring is molded from longitudinally extending fibrous material impregnated with the thermosetting resin and separate metal end sections are attached through mechanical connectors to the ends of the central section. This is a relatively expensive construction, for it is necessary to trim or machine the ends of the fiber reinforced resin leaf, drill connecting holes, and then assemble the metal brackets or connectors to the ends of the leaf. Furthermore, the trimming of the fibrous material results in exposed fiber ends which are susceptible to degradation from water and salt.

In other forms of fiber reinforced resin leaf springs, continuous strands of fibrous material impregnated with a thermosetting resin are wound around spaced bushings or pins in a loop configuration. After winding, the wound structure is placed in a mold with the parallel runs of the loop being brought together in flatwise contiguous relation and the resin is subsequently cured to provide an integral structure. In springs of this type, the fibrous strands extend continuously around the end sections and join the curved central section at neck regions and there is normally a small, transversely extending, V-shaped discontinuity bordering the opening in the end section, where the upper and lower runs are brought together in the neck region. In service, when a load is applied to the end portions of the spring, the spring may tend to delaminate, starting at the V-shaped discontinuity and progressing along the neutral axis. Further, torsional load applied to springs on turning of the vehicle, or torsional stress resulting from independent wheel suspension, can also have a tendency to delaminate the strands at the neutral axis in the neck region.

To prevent this delamination, it has been proposed to add clamps or other fasteners at the vulnerable neck region, but the addition of these fasteners normally requires holes, or other openings to be formed in the spring, which severs the longitudinally extending reinforcing strands and correspondingly reduces the physical characteristics of the spring.

SUMMARY OF THE INVENTION

The invention is directed to an improved fiber reinforced resin leaf spring having increased stiffness at the neck regions which join the curved central section to the respective end sections.

The spring is formed by winding a strand of fibrous material impregnated with an uncured thermosetting resin around a pair of spaced pins or bushings in a loop configuration to provide a pair of generally parallel runs, that extend between the bushings, and curved end portions that extend around the bushings and connect the parallel runs together.

After winding, the wound structure is placed in a mold with the parallel runs brought into flatwise relationship and the structure is molded under heat and pressure to cure the resin and provide a rigid integral structure.

In accordance with the invention, the mold is constructed to provide the neck region with a plurality of longitudinally extending ribs or corrugations. The ribs extend alternately upwardly and downwardly from a plane passing through the neutral axis of the spring. The outer ends of the ribs merge into the respective end sections, while the inner ends of the ribs taper into the central section of the spring.

The ribs provide increased stiffness at the neck region to prevent delamination in this region. With the invention, the stiffness is increased at the location of the V-shaped discontinuity from which delamination can propogate, and this substantially reduces the tendency for delamination of the spring during service.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a leaf spring made in accordance with the invention;

FIG. 2 is an enlarged fragmentary side elevation of one end of the leaf spring;

FIG. 3 is a section taken along line 3—3 of FIG. 2; and

FIG. 4 is a section taken along line 4—4 of FIG. 2.

DESCRIPTION OF THE ILLUSTRATED EMBODIMENT

FIG. 1 illustrates a fiber reinforced resin leaf spring 1 for use with a vehicle, which consists of a central curved section 2 and a pair of generally circular end sections 3 and 4 which are integrally connected to central section 2. Each end section 3 and 4 defines an opening 5 which receives a connector to attach the spring to a vehicle in a conventional manner. In certain applications, a metal or resilient bushing can be molded in the end sections 3 and 4, in which case the bushing will define the opening 5. As illustrated in FIG. 2, the end sections have a generally oblong configuration, but in certain installations they can be circular. Thus, the term "generally circular", as used in the specification and claims, is intended to include both oblong and circular end sections, or configurations of similar shape.

Spring 1 is formed of substantially continuous strands of fibrous material which are wound in a loop configuration around a pair of spaced pins or bushings in a number of superimposed layers to provide the desired physical characteristics for the spring.

The strand can take the form of any type of fibrous material normally used in filament winding operations, as for example, synthetic fibers, such as nylon, Dacron or Orlon; mineral fibers, such as glass; vegetable fibers, such as cotton; animal fibers, such as wool; or metal fibers, such as steel wire or graphite.

The strands are impregnated with an uncured liquid thermosetting resin prior to being wound in the loop configuration. The resin is a type conventionally used in filament winding operations and can take the form of a polyester, vinyl ester, or epoxy resin.

After the winding operation has been completed, the wound structure is molded to form the spring as shown in FIG. 1. In the molding operation the two parallel runs of the wound loop structure, indicated by 6 and 7, are brought together in a mold and during the molding operation the resin is cured to provide a rigid integral structure. In the molded structure the reinforcing strand extends continuously from the central section 2 and around the end sections 3 and 4, with the junction between the central section 2 and the respective end sections constituting neck regions, as indicated by 8. As shown in FIG. 2, the interface between the two runs 6 and 7 extends along the neutral axis 9 of the spring.

During the molding operation, the runs 6 and 7 are forced inwardly around the pin or bushing that defines the openings 5 in the end sections, and because of this, the molded structure is normally formed with a small, transversely extending, V-shaped gap or discontinuity 10 where the two runs 6 and 7 meet 5. During service, it has been found that delamination may occur along the interface face between the runs 6 and 7, i.e. along the neutral axis, and this delamination will originate from the discontinuity 10 and progress inwardly toward the center of the spring.

In accordance with the invention, a series of longitudinally extending ribs or corrugations 11 are molded into the spring in the neck region 8. Each rib is composed of a pair of outwardly converging side surfaces 12 which terminate in a generally flat outer surface 13. Adjacent ribs on either side of the spring are spaced apart by generally flat valleys 14. As best shown in FIGS. 3 and 4, ribs 11 extend upwardly and downwardly from a plane passing through the neutral axis 9 of the spring. More particularly, ribs 11a extend upwardly from the plane, while ribs 11b extend downwardly. Because of the molding operation, the V-shaped gap axis is displaced in the neck region, as indicated by the dashed line 15.

The outer ends of the ribs 11 have a greater depth than the inner ends and the outer ends of the ribs merge into the respective end sections 3 and 4, while the inner ends of the ribs taper into the central section 2.

The ribs or corrugations provide increased stiffness at the neck region 8, so that the area of lesser stiffness is displaced inwardly a substantial distance from the discontinuity 10. This aids in preventing delamination along the interface between the runs 6 and 7.

Various modes of carrying out the invention are contemplated as being within the scope of the following claims particularly pointing out and distinctly claiming the subject matter which is regarded as the invention.

I claim:

1. A fiber reinforced resin leaf spring construction comprising, a curved central section and a pair of generally circular end sections connected to the respective ends of the central section, each end section defining an opening, said spring comprising an endless strand of substantially continuous fibers impregnated with a cured thermosetting resin, said strand disposed in an upper run and a lower run in said central section and said strand extending through said end sections to connect said upper and lower runs, said upper and lower runs being bonded together flatwise at a neutral axis, the portion of said strand joining each run and the respective end section constituting a neck region, and a plurality of longitudinally extending ribs disposed in said neck region, said ribs extending alternately upwardly and downwardly from a plane passing through said neutral axis, said ribs increasing the stiffness of the spring in the neck region to prevent delamination along said neutral axis.

2. The spring of claim 1, wherein the neck regions and the central section have a substantially constant cross sectional area throughout their length.

3. The spring of claim 1, wherein the depth of each rib decreases in a direction from the end section toward the longitudinal center of the central section.

4. The spring of claim 3, wherein adjacent upwardly extending ribs are separated by an upper valley and adjacent downwardly extending ribs are separated by a lower valley, the portions of said valleys disposed adjacent the respective end sections being located adjacent a plane extending through said neutral axis.

5. The spring of claim 1, wherein each rib is provided with a pair of outwardly converging side walls and a generally flat outer surface, said outer surfaces merging into the respective upper and lower surfaces of said central section.

6. A fiber reinforced resin leaf spring construction comprising, a curved central section and a pair of generally circular end sections connected to the respective ends of the central section, each end section defining an opening, the portions of said spring connecting the central section with the respective end sections constituting neck regions, and a plurality of longitudinally extending ribs disposed in each neck region, said ribs extending upwardly and downwardly from the midpoint of the thickness of said neck region, the depth of each rib decreasing in a direction from the end section toward the center of the spring.

* * * * *